(12) United States Patent
Van de Ven

(10) Patent No.: US 8,074,601 B2
(45) Date of Patent: Dec. 13, 2011

(54) FEEDER PAN FOR POULTRY

(76) Inventor: Cornelius Antonius Wilehlmus Van de Ven, NB Eersel (NL)

( * ) Notice: Subject to any disclaimer, the term of this patent is extended or adjusted under 35 U.S.C. 154(b) by 0 days.

(21) Appl. No.: 12/595,954

(22) PCT Filed: Apr. 23, 2008

(86) PCT No.: PCT/NL2008/050239
§ 371 (c)(1),
(2), (4) Date: Apr. 5, 2010

(87) PCT Pub. No.: WO2008/130238
PCT Pub. Date: Oct. 30, 2008

(65) Prior Publication Data
US 2010/0192863 A1    Aug. 5, 2010

(30) Foreign Application Priority Data

Apr. 23, 2007   (NL) ...................................... 1033733

(51) Int. Cl.
*A01K 39/014*   (2006.01)

(52) U.S. Cl. ...................................... 119/52.4; 119/52.1

(58) Field of Classification Search ............... 119/51.01, 119/52.1, 51.12, 52.4, 53, 56.1, 57.1, 57.2, 119/57.4, 61.5, 57.92; D30/121, 129, 131, D30/132, 133
See application file for complete search history.

(56) References Cited

U.S. PATENT DOCUMENTS

| | | | |
|---|---|---|---|
| 3,664,304 A | | 5/1972 | Carter |
| 3,712,270 A | | 1/1973 | Fier |
| 5,875,733 A | * | 3/1999 | Chen ........................... 119/57.4 |
| 5,927,232 A | * | 7/1999 | Pollock ........................... 119/53 |
| 5,957,083 A | * | 9/1999 | Cheng ........................... 119/57.4 |
| 6,532,895 B1 | * | 3/2003 | Andersen ........................ 119/57.4 |
| 6,655,317 B1 | * | 12/2003 | Steudler et al. ................... 119/53 |
| 7,647,888 B2 | * | 1/2010 | Slankard et al. ................... 119/53 |
| 2003/0056730 A1 | * | 3/2003 | Corti et al. ........................ 119/53 |
| 2006/0005774 A1 | | 1/2006 | Bornhofen |

FOREIGN PATENT DOCUMENTS

| | | |
|---|---|---|
| EP | 0 327 302 | 8/1989 |
| FR | 2509961 | 1/1983 |

* cited by examiner

*Primary Examiner* — T. Nguyen
(74) *Attorney, Agent, or Firm* — Eric Karich

(57) ABSTRACT

A feeder pan for poultry has a sunk bottom and an edge surrounding the bottom, the bottom being resiliently transformable and the edge being rigid. The bottom can be made of a relatively soft plastic, such as a thermoplastic elastomer, whereas the edge can be made of a relatively hard plastic, such as a polyolefin or a polyamide. The edge may present a profile and may present a closed section.

9 Claims, 4 Drawing Sheets

FEEDER PAN FOR POULTRY

FIELD OF THE INVENTION

The invention relates to a feeder pan for poultry, which comprises a sunken bottom and an edge surrounding the bottom.

STATE OF THE ART

A feeder pan of this type is known from FR-A-2 509 961. There are different systems for feeding poultry. One of the known feeding systems utilizes a large number of feeder pans which are suspended at different points in a poultry house structure at a small distance from the ground. These feeder pans are filled from a central point. For this purpose the feeding system comprises transport conveyors which convey the feed from the central point to the various feeder pans. These transport conveyors are in the shape of tubes or chutes which are height-adjustably suspended in the poultry house structure and in which augers, spirals, conveyor chains or conveyor cables are moved. The feeder pans as such are suspended from these conveyor tubes which have a feed access orifice at the location of each feeder pan.

A problem with feeder pans of this type is the wear of the bottom, because the brood-sized poultry peck against the bottom with their beaks when taking in feed. In order to counteract this wear the pointed ends of the beaks are trimmed, which, however, adversely affects the welfare of the brood-sized poultry.

SUMMARY OF THE INVENTION

It is an object of the invention to provide a feeder pan of the type defined in the opening paragraph, in which said problem does not occur or at least occurs to a lesser extent. For this purpose, the feeder pan according to the invention is characterized in that at least a portion of the upper layer of the bottom is made of a soft material. As a result, the bottom is more durable and the welfare of the brood-sized poultry is enhanced because their beaks need no longer be trimmed and they, when taking in feed, do not peck at a hard bottom but at a soft layer. Preferably at least a portion of the upper layer of the bottom is made of a resilient material, for example rubber.

An embodiment of the feeder pan according to the invention is characterized in that in essence the whole bottom is made of a soft material.

Another embodiment of the feeder pan according to the invention is characterized in that the bottom comprises an upper layer of a soft material, as well as a lower layer of a hard material present underneath. The upper layer may then be detachably positioned on the lower layer, while the edge is connected to the lower layer.

A further embodiment of the feeder pan according to the invention is characterized in that the bottom or the upper layer of the bottom is provided with a plurality of pins pointing upwards from the upper layer. This avoids the poultry starting to throw feed around or starting to spill feed respectively. In addition, these pins, which can be made of the same soft material as the upper layer of the bottom, give the impression of being grass, so that a natural environment is simulated.

A problem for the design of a feeding system is that poultry in a poultry house structure are generally going through various stages of development, starting as day-old chicks and ending as young cocks or pullets. The feeding system is thus to be suitable for continuing to adequately feed the poultry during these stages of development. In particular the accessibility then forms a stumbling block. Since the feeder pan is to be dimensioned such that it can also contain sufficient feed for pre-harvest size poultry, it is often too large for day-old chicks. The day-old chicks often have a lot of difficulty reaching over the edge of the feeder pan with their beaks to peck the feed from the feeder pan. This is a problem because for the development and growth of the poultry it is of major importance for them to take in sufficient feed from the beginning.

An embodiment of the feeder pan according to the invention for which the problem described above does not occur or at least to a lesser extent is characterized in that the bottom is transformable and the edge is rigid, while the bottom has a raised centre portion with a central opening. When the tube system from which the feeder pan is suspended is moved downwards to such an extent that the feeder pan touches the ground, the bottom will transform as a result of the load acting on it and to such an extent that the rigid edge comes to rest on the ground. This lowers the edge, so that particularly brood-sized poultry are able to peck feed from the pan in a simpler manner. Another advantage of the transformable bottom is that—when the poultry grow and the feeder pan is suspended free from the bottom—the bottom is transformed under the influence of the weight of the feed contained therein to such an extent that the part that is most remote from the rigid edge, that is, the centre portion, will be suspended the deepest. As a result, the feed can be spilled less quickly over the edge of the feeder pan. Finally, the bottom in this position will be subject to vibrations while the poultry are pecking at the feed. This vibratory movement provides that the feed always keeps moving to the deepest part of the feeder pan, thus to the centre portion.

It is observed that a feeder pan with a transformable bottom provided with a central opening can also be utilized for feeder pans having a bottom whose upper side is made of a hard material.

The bottom is preferably resiliently transformable. In this manner it is guaranteed that it returns to its original position when the feeder pan is raised from the ground.

In a further preferred embodiment of the feeder pan according to the invention the bottom is convex in the centre. As a result, when the feeder pan is lowered to the ground, the bottom will transform from the centre outwards, so that feed in the pan is forced to flow more towards the edge where is can be reached more easily by brood-sized poultry.

The sought difference in rigidity between the bottom and the edge can be achieved in a simple manner when the bottom and the edge are made of different materials.

In that case the bottom is preferably made of a relatively soft plastic and the edge of a relatively hard plastic. A plastic feeder pan can be manufactured at low manufacturing costs and in a simple manner and is robust and free of maintenance. In addition, the soft plastic bottom forms a nice surface for the poultry to peck the feed from. It should for that matter be borne in mind that the beaks of the poultry are often trimmed.

If the bottom and edge are formed as a whole, no assembling operations would be needed, as a result of which the manufacturing costs may be reduced further.

In a preferred embodiment of the feeder pan according to the invention the edge shows a profile, as a result of which its rigidity is enhanced. A very rigid edge of small height is obtained when it shows a closed section. In addition, this reduces the risk of foul accumulating in or near the edge.

If the feeder pan is made of plastic, the edge can then preferably be produced by means of a gas injection moulding process.

For the feed in the feeder pan to be taken up evenly distributed in the neighbourhood of the edge, the bottom preferably shows a raised centre portion with a central opening. In this way in fact an annular feeder pan is obtained.

If the raised centre portion extends from the bottom to above the edge, feed flowing from the tube into the feeder pan can be distributed evenly over the circumference thereof.

Another problem is that the feeding system is to be designed in such a way that it can be cleaned in a fast and simple manner. For, once the poultry have reached the pre-harvest size, they are removed from the poultry house structure and this structure is to be cleaned and disinfected before a next batch of one-day chicks can be admitted. Since contemporary poultry farms are highly capitalised, the cleaning process is to be carried out in the fastest possible way, so that the structure can be re-used as quickly as possible. However, since chicks are highly sensitive to contamination, it is of major importance for the cleaning process to be carried out very thoroughly. The shape of the feeder pans, which according to their nature are intended to hold something, then forms a problem; as a result, contaminations are inclined to accumulate at the bottom of the feeder pans and can only be removed with much effort.

In order to clean the feeder pan in a simple manner, a further embodiment of the feeder pan according to the invention is characterized in that the raised centre portion can be tipped downwards. In consequence, this centre portion in the form of a sleeve can protrude underneath the bottom of the feeder pan. In this position the feeder pan can be simply cleaned because the cleansing water can flow away through the centre portion that has tipped downwards, so that no remainders are left behind.

The bottom further preferably has an orifice extending downwards from the raised centre portion. On the one hand, this orifice is used as a handle for pulling the centre portion of the bottom down so that it tips and, on the other hand, as a column that is obstructed by the floor when the feeder pan is lowered and thereby pushes up the centre portion of the bottom until the initial position is reached.

BRIEF DESCRIPTION OF THE DRAWINGS

The invention will now be described in more detail based on an example while reference is made to the appended drawing figures, in which.

DETAILED DESCRIPTION OF THE DRAWINGS

Figure 1:
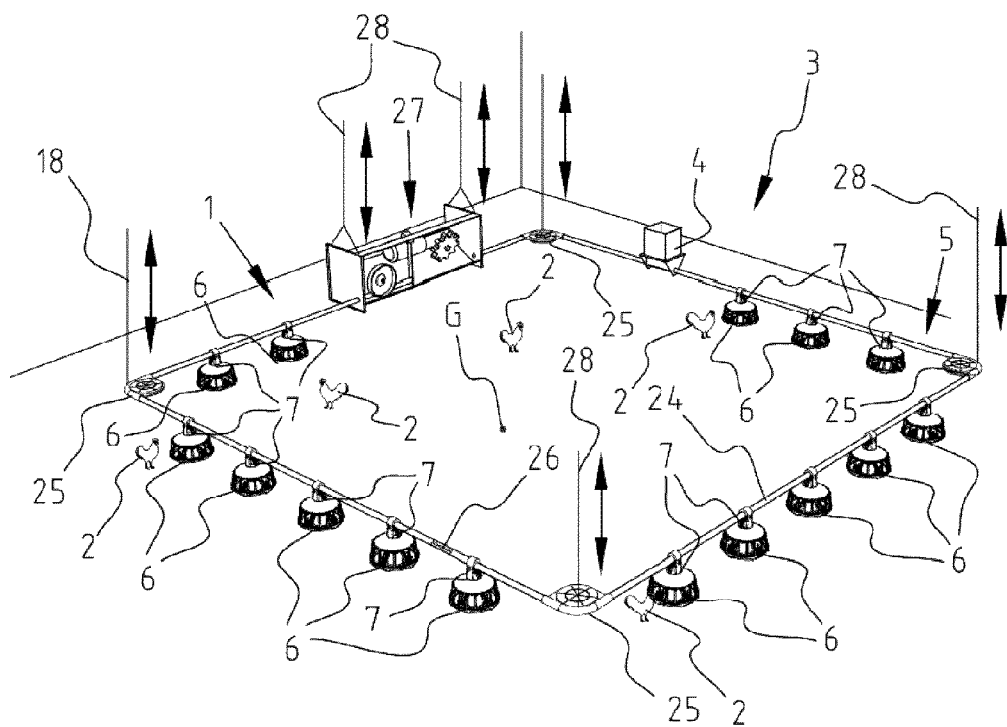
FIG. 1 shows a perspective view of a poultry house structure with therein a large number of feeder pans according to the invention.
Figure 2:
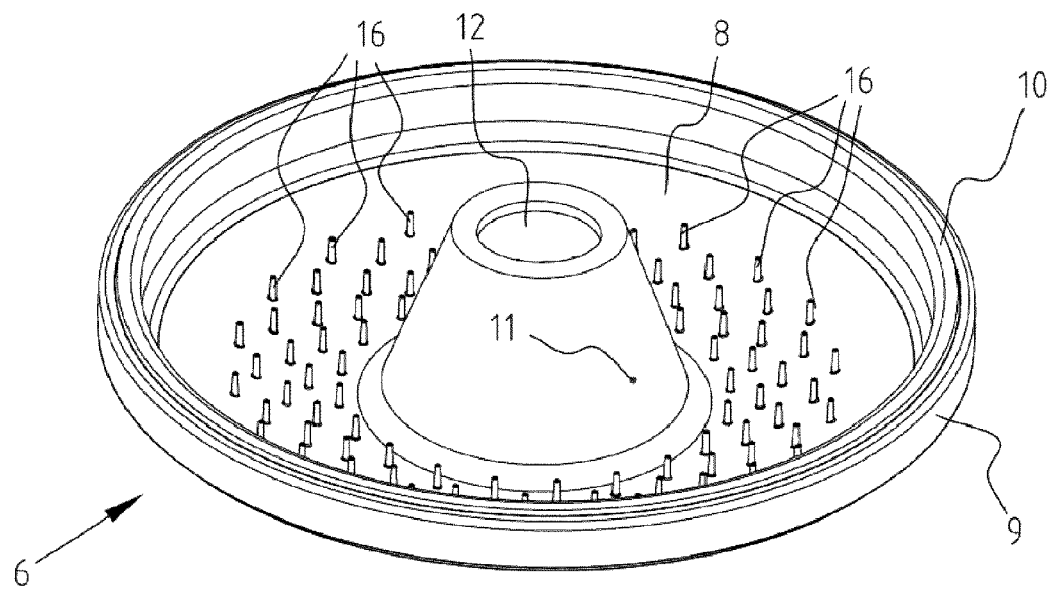
FIG. 2 shows a perspective top plan view of one of the feeder pans shown in FIG. 1.

A system 1 for feeding animals 2, more particularly poultry, in a poultry house structure 3 comprises a storage hopper 4 for the feed and a transport conveyor 5 that goes round (FIG. 1) extending into the poultry house structure 3 from the storage hopper 4. This transport conveyor 5 is formed by a plurality of tubes 24 which are connected by elbows 25 and in which a transport chain 26 is moving. Also other transport elements, such as for example augers, spirals or transport cables are conceivable, however. These transport elements are put in motion by a drive system 27. Albeit the tubes 24 in the example shown show a completely closed section, they could as well be open at the top and could thus actually form chutes.

Figure 5:
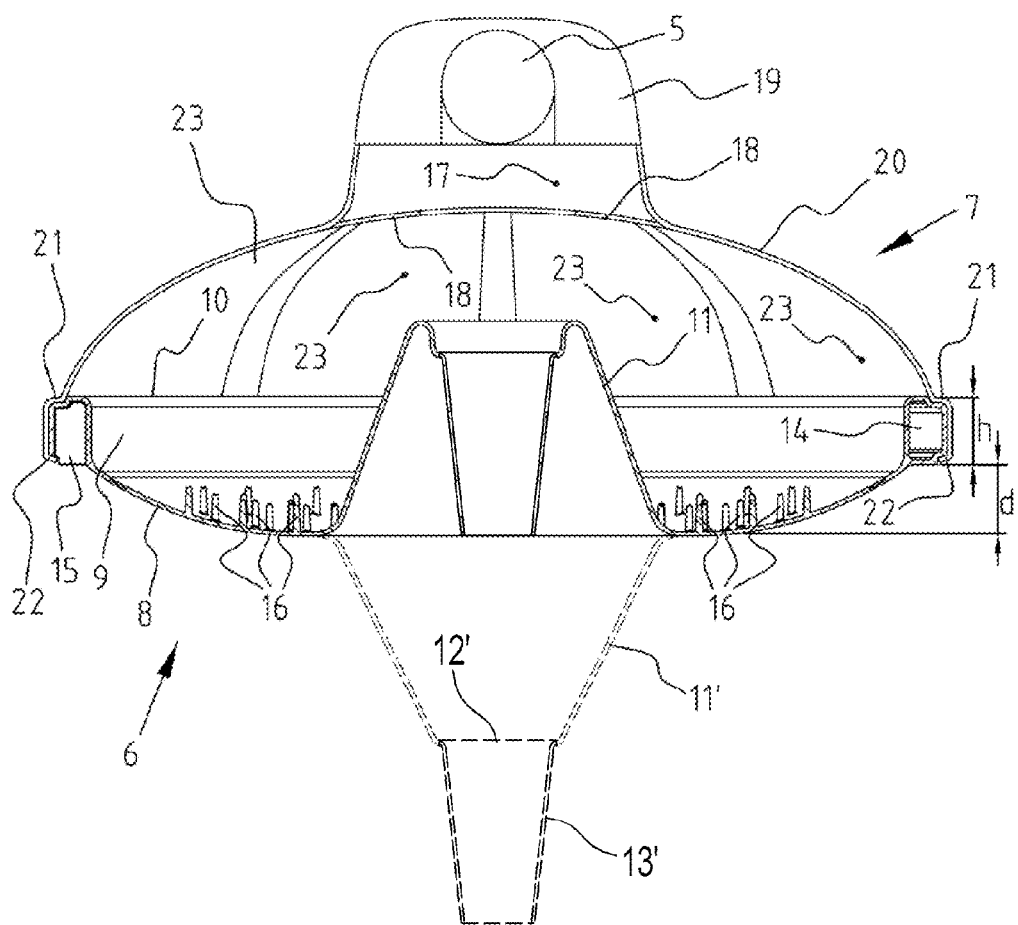
FIG. 5 shows a cross-section along the line V-V in FIG. 4, while also a schematic representation is given of a suspension frame for the feeder pan.

From the tubes 24 of the transport conveyor 5 are suspended a large number of regularly interspersed feeder pans 6. These feeder pans 6 are suspended from the tubes 24 by means of special frames 7 which can be clamped for example around the tubes 24. At the location of each feeder pan 6 the tubes 24 present openings (not shown here) through which feed may drop from the tube 24 into a space 17 in the suspension frame 7 (FIG. 5). This space 17 has an opening 18 at the bottom, which can be optionally opened or closed by means of a controllable gate (not shown here). The height at which the feeder pans 6 are suspended above the ground G in the poultry house structure 3 can be adjusted, so that it can be adapted to the needs and capabilities of the poultry 2. In the example shown the feeder pans 6 are suspended at a fixed height from the transport conveyor 5 by means of the frames 7, but this transport conveyor 5 is height-adjustably suspended in the poultry house structure 3 by means of a plurality of cables 28 connected to winches (not shown).

Each feeder pan 6 has a sunk bottom 8 and an edge 9 surrounding the bottom 8. This edge 9 actually determines the accessibility to the feed in the feeder pan 6 for the poultry 2. In conventional feeder pans 6 the height H of the rim of the edge 9 above the ground G is at least equal to the depth d of the bottom 8, thus the variation from the edge 9 towards the centre, increased by the vertical dimensions h of the edge: H=d+h. When the poultry 2 are very small, for example day-old chicks, this height forms an impediment for them to reach the feed in the feeder pan 6.

Therefore, the feeder pan 6 according to the present invention comprises a bottom 8 that can be transformed, whereas the edge 9 is relatively rigid. In this way it is achieved that when the transport conveyor 5 with the feeder pans 6 attached is lowered until the bottoms 8 of the pans 6 touch the ground G, these bottoms as it were subside to the weight resting thereon of the transport conveyor 5, and are thus transformed. The transport conveyor 5 can then be lowered even further until the relatively rigid edges 9 of the feeder pans come to rest on the ground G. The height H of the rim 10 of the edge 9 above the ground G is then only equal to the vertical measure h of the edge 9 itself: H=h. In this way also very small poultry 2 can reach or climb over the edge 9 into the feeder pan 6 so as to peck feed there from the bottom 8. Incidentally, the bottom 8 in the example shown is resilient, so that it returns to its sunk initial position under its own weight as soon as the transport conveyor 5 is raised far enough. The latter occurs when the poultry 2 have grown sufficiently.

Figure 6:
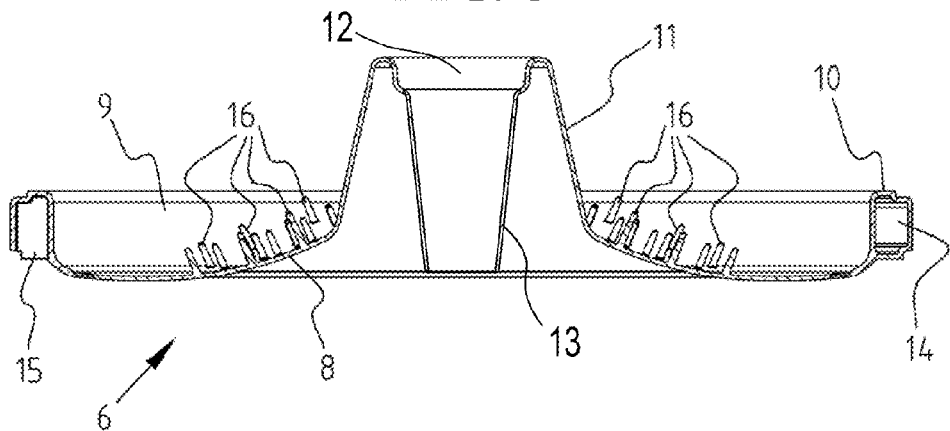
FIG. 6 shows a cross-section corresponding to that of FIG. 5, without the suspension frame, of the feeder pan when the feeder pan bottom is transformed.
Figure 7:
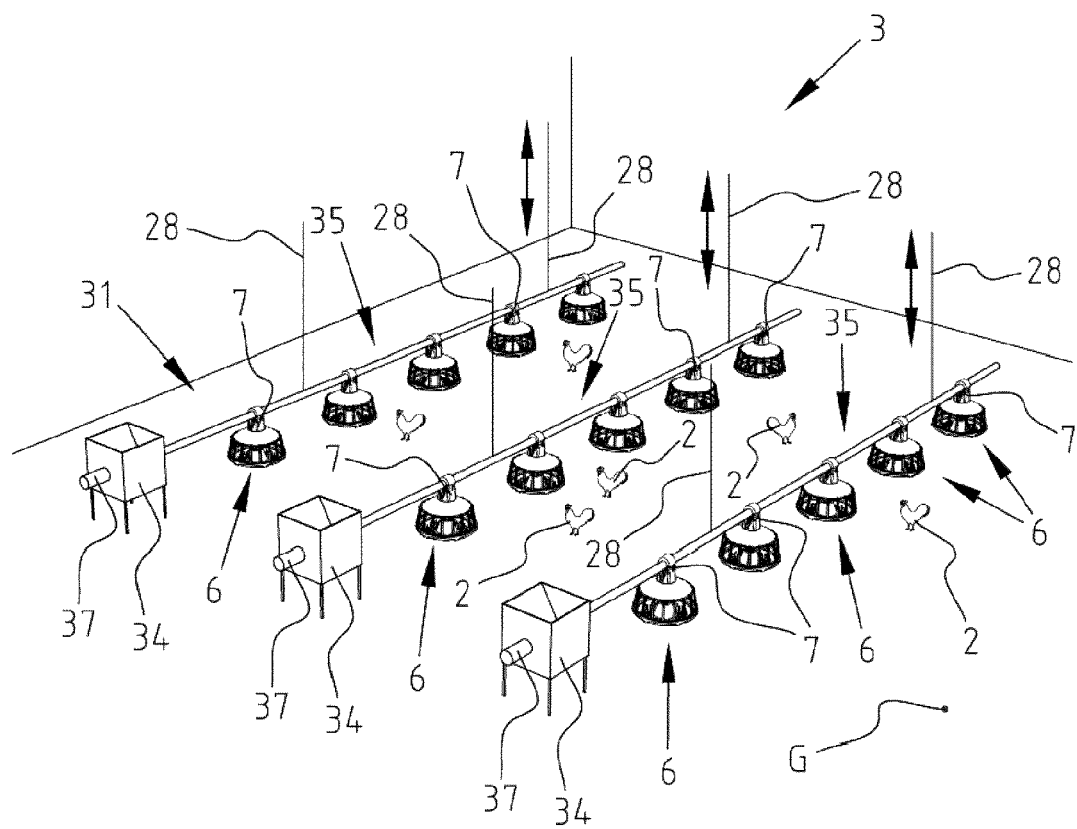
FIG. 7 shows a perspective view of another embodiment of the poultry house structure.

Since the bottom 8 of the feeder pan 6 in the example shown is convex, and the deepest point thereof is thus relatively far to the centre, the bottom 8 when lowered onto the ground F will transform from the centre outwards (FIG. 6). The advantage of this is that feed that is poured into the pan 6 will be forced outwards as a result of the change of shape of the bottom 8, where the feed will be easily within reach for the young animals 2, more particularly the day-old chicks.

For that matter, the feeder pan 6, even if the bottom 8 is not transformed, is in fact already annular because of the presence of a raised centre portion 11 with a central opening 12 in it. This raised centre portion 11 extends from the bottom 8 to above the edge 9. The edge 9 on the outside of the feeder pan 6 thus forms the lowest border, so that any spilled feed thus ends up outside the feeder pan 6 on the ground G and not in the central opening 12 where the animals 2 cannot reach it.

A funnel 13 extends downwards from the raised centre portion 11. This funnel on the one hand serves as a handle for pulling the centre portion 11 of the bottom downwards, so that this centre portion tips over, and on the other hand as a column that is obstructed by the floor when the feeder pan 6 is lowered and then pushes up the centre portion 11 of the bottom until it reaches its initial position.

Albeit the desired difference in rigidity between the bottom 8 and the edge 9 in essence could be achieved by only a suitable dimensioning and configuration of these component parts, this can be achieved in a simpler manner by making the bottom 8 and the edge 9 of materials that have different properties. In the example shown the choice has been made to make both the bottom 8 and the edge 9 of plastic, the bottom 8 then being a relatively soft plastic and the edge 9 a relatively hard plastic. Suitable plastics are for example thermoplastic elastomers, such as SEBS, SBS, PPV, TPO, TPU or SOPE for the bottom 8 and polyamides or polyolefins such as polypropylene for the edge 9. The bottom 8 and the edge 9 can then also be manufactured as one whole by means of a so-called two-component injection moulding process.

Figure 3:
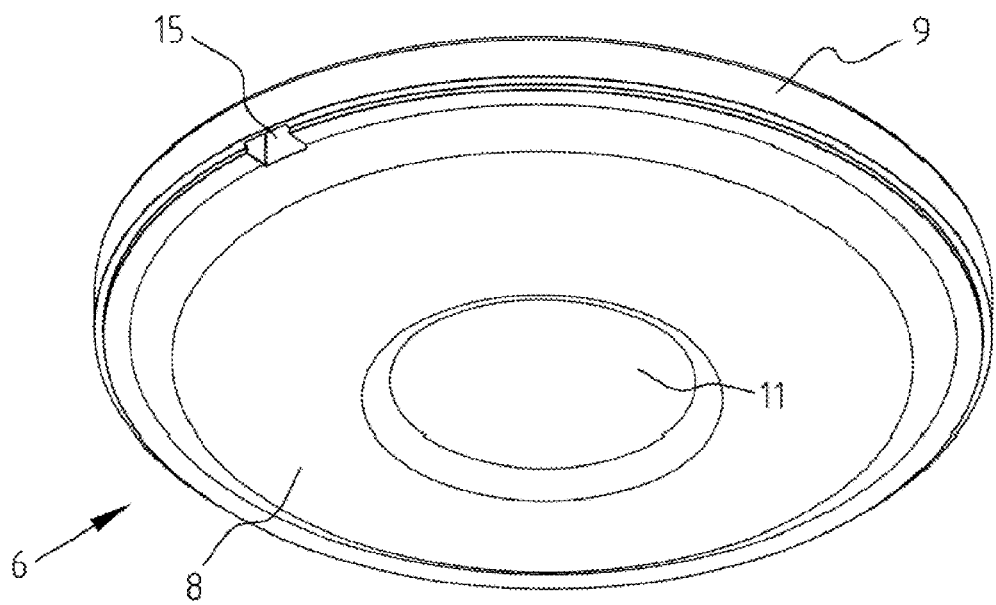
FIG. 3 shows a perspective bottom view of the feeder pan shown in FIG. 2.
Figure 4:
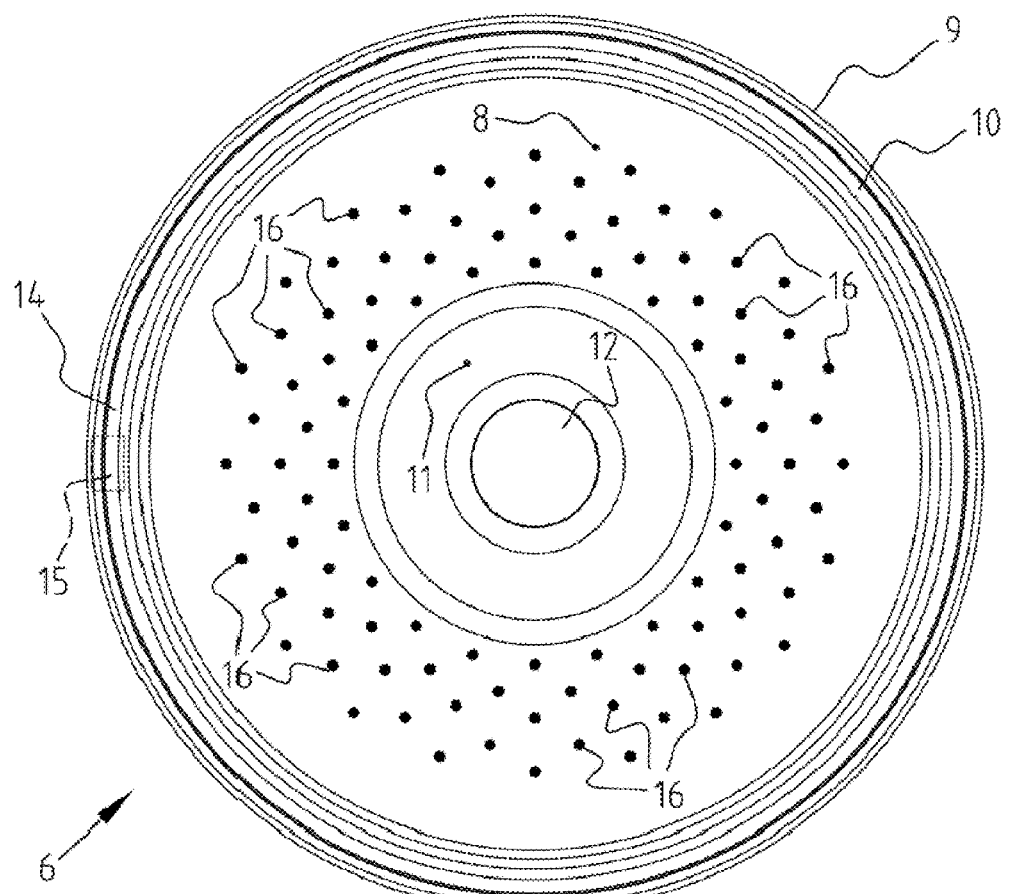
FIG. 4 shows a top plan view of the bottom of the feeder pan shown in FIGS. 2 and 3.

In order for the edge 9 to have sufficient rigidity, without the need to make the height h too large, it is configured to have a profile. In the example shown the edge 9 even has a closed section, as a result of which it forms as it were a funnel bent around the bottom 8. Such a closed-section can be achieved in plastic by utilizing a gas injection moulding process in which immediately after the injection moulding of the edge 9 a gas is injected into the mould to create a hollow interior space 14. Only at the point where the gas injection took place is the closed section interrupted by an opening 15 (FIGS. 3, 5).

As stated earlier, the bottom 8 of the feeder pan 6 according to the invention is made of a soft plastic and thus forms a more agreeable surface for the poultry 2 to peck the feed from than the hard bottom of a conventional feeder pan. It should also be borne in mind that the beaks of laying birds nowadays have to be clipped in order to counteract cannibalism. In order to simulate a natural environment in the feeder pan 6, this feeder pan 6 shown in the example further has a plurality of pins 16 pointing upwards from the bottom 8. These pins 16, which in the example shown are made of the same soft material as the bottom 8, convey the impression of being grass-stalks. The pins 16 can simply be moulded together with the bottom 8. The presence of the pins 16 provides that the poultry 2 will not start throwing the feed around or spilling it.

Since the bottom 8 is resiliently transformable, this also holds for the raised centre portion 11. This centre portion 11 can thus be turned back downwards to a funnel-like position shown in broken lines in FIG. 5 by grabbing in the central opening 12 from below and pulling at the funnel 13. In this position of the centre portion 11 the feeder pan 6 can be thoroughly cleaned and the rinsing water used can flow away in a simple manner. It should then be borne in mind that for the cleaning operation the transport conveyor 5 is always moved upwards rather high, on the one hand, to be able to carry out the cleaning operation at normal working height and, on the other hand, to be able to effectively clean the ground G underneath the transport conveyor 5 and feeder pans 6. Thus underneath the feeder pans 6 there is ample room for the then funnel-like centre portion 11. As a consequence of the resilient nature of the bottom 8, the centre portion 11 will tip upwards again when the transport conveyor 5 is lowered so far as to touch the ground G. Needless to observe that the centre portion after cleaning can also be tipped back by hand.

The frame 7 with which the feeder pan 6 is suspended from the tube 24 of the transport conveyor 5 includes a clamp 19 which is installed around the tube 24, and a suspension element 20 connected thereto holding the feeder pan 6. This suspension element 20 thereto presents an edge 21 with a number of fingers 22 that can be snapped under the edge 9 of the feeder pan 6. The suspension element 20 has a large number of openings 23 above its edge 21 through which openings the animals 2 can reach the contents of the feeder pan 6. The upper part of the suspension element 20 accommodates the space 17 in which the feed is poured. As mentioned earlier, this space 17 has an orifice 18 at the bottom which can be shut off by means of a gate (not shown).

The feeder pan according to the invention as described above thus makes it possible to adequately feed poultry from the first day onwards. In addition, the described feeder pan can be manufactured in a simple and cost-effective manner and can be cleaned in a fast and thorough manner.

Albeit the invention described above has been described in the foregoing with reference to an example, it will be evident that the invention is not by any manner or means restricted thereto. Within the spirit and scope of the invention the feeder pan could be embodied differently at various points. The extent of the invention is indeed exclusively determined by the following claims.

The invention claimed is:

1. A feeder pan for poultry, comprising:
   a sunk bottom; and
   a rigid edge surrounding the bottom, the ridged edge having a rim;
   wherein the distance between the rim and the lowest part of the bottom is greater than the height of the edge, and also wherein the bottom is transformable such that the distance is equal to the height of the edge.

2. A feeder pan as claimed in claim 1, wherein the bottom has a raised center portion with a central opening.

3. A feeder pan as claimed in claim 2, wherein the raised center portion extends from the bottom to above the edge.

4. A feeder pan as claimed in claim 3, wherein the raised center portion can be tipped downwards.

5. A feeder pan as claimed in claim 4, wherein the bottom further includes a funnel extending downwards from the raised center portion.

6. A feeder pan as claimed in claim 1, wherein the bottom and the edge are made of different materials.

7. A feeder pan as claimed in claim 6, wherein the bottom is made of a relatively soft plastic and the edge is made of a relatively hard plastic.

8. A feeder pan as claimed in claim 7, wherein the bottom and the edge are molded as a whole.

9. A feeder pan for holding feed for poultry, the feeder pan comprising:
   a sunk bottom that is concave and adapted for holding the feed;
   a rigid edge surrounding the bottom, the ridged edge having a rim;
   a center portion of the sunk bottom, the center portion having a central opening;
   a funnel extending downwards from the center portion;
   the centre portion being formed of a flexible material that enables the center portion to be moved between a raised position wherein the center portion extends from the bottom to above the edge, and a lowered position wherein the centre portion is tipped downwards such that the funnel is entirely beneath the sunk bottom.

* * * * *